United States Patent
Daikoku et al.

(10) Patent No.: US 8,425,268 B2
(45) Date of Patent: Apr. 23, 2013

(54) ELECTRIC OUTBOARD MOTOR

(75) Inventors: Keisuke Daikoku, Shizuoka (JP);
Tetsushi Achiwa, Shizuoka (JP);
Masatoshi Kimpara, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 129 days.

(21) Appl. No.: 13/022,704

(22) Filed: Feb. 8, 2011

(65) Prior Publication Data

US 2011/0244739 A1 Oct. 6, 2011

(30) Foreign Application Priority Data

Mar. 31, 2010 (JP) ................................. 2010-083231

(51) Int. Cl.
*B60L 11/00* (2006.01)
(52) U.S. Cl.
USPC .................................................................. 440/6
(58) Field of Classification Search .................... 440/6
See application file for complete search history.

(56) References Cited

U.S. PATENT DOCUMENTS

| | | |
|---|---|---|
| 3,619,632 A | 11/1971 | Labombarde |
| 4,386,918 A | 6/1983 | Matthews |
| 4,949,046 A * | 8/1990 | Seyfang ................. 324/427 |
| 5,371,454 A | 12/1994 | Marek |
| 2004/0266280 A1 | 12/2004 | Jones |
| 2009/0039705 A1 | 2/2009 | Lyman |
| 2011/0175569 A1* | 7/2011 | Austin ................. 320/109 |

FOREIGN PATENT DOCUMENTS

| | | |
|---|---|---|
| JP | 2005-153727 A | 6/2005 |
| JP | 2005-162055 A | 6/2005 |

OTHER PUBLICATIONS

Australian Patent Application No. 2011200477: Examiner's first report, dated Jun. 28, 2011.

* cited by examiner

*Primary Examiner* — Stephen Avila

(74) *Attorney, Agent, or Firm* — Troutman Sanders LLP

(57) ABSTRACT

An electric outboard motor to be driven by an electric motor separately includes an electric outboard motor main body including the electric motor and a propulsion section that applies the electric motor as motive power and a power supply section supplying power to the electric motor, in which the electric outboard motor main body and the power supply section are detachably connected by couplers via a cable. Further, the coupler of the cable is allowed to be attached and detached to and from the coupler on a side of the power supply section.

4 Claims, 13 Drawing Sheets

ELECTRIC OUTBOARD MOTOR

CROSS-REFERENCE TO RELATED APPLICATIONS

This application is based upon and claims the benefit of priority of the prior Japanese Patent Application No. 2010-083231, filed on Mar. 31, 2010, the entire contents of which are incorporated herein by reference.

BACKGROUND OF THE INVENTION

1. Field of the Invention

The present invention relates to an electric outboard motor.

2. Description of the Related Art

In recent years, in consideration of an influence on an environment, an electric outboard motor to be driven by an electric motor has been attracting attention. For example, in Patent Document 1 and Patent Document 2, there has been disclosed an electric outboard motor having an electric motor housed in a motor room of an outboard motor main body. These electric outboard motors each have a structure such that output of the electric motor, namely rotation of an output shaft is transmitted to a propeller shaft through a drive shaft and a bevel gear to rotate a propeller. Further, in these electric outboard motors, the motor room covered with a motor cover is formed in order to house the electric motor therein. In the above motor room, besides the electric motor, a rechargeable battery supplying power to the above electric motor and a control unit controlling rotation speed of the electric motor and the like are provided. According to the electric outboard motors as above, as compared with an engine outboard motor, for example, an exhaust gas is not discharged into the water, so that it is possible to reduce the influence on the environment.

[Patent Document 1] Japanese Laid-open Patent Publication No. 2005-153727

[Patent Document 2] Japanese Laid-open Patent Publication No. 2005-162055

However, in the above-described electric outboard motors, all the electric motor, the rechargeable battery, and the control unit are large and heavy objects. Thus, when they are provided in the electric outboard motor, a problem that the electric outboard motor is increased in size and weight is caused. The weight of the electric outboard motor changes depending on a cruising distance and a cruising time, but it becomes heavy as compared with, for example, an engine outboard motor with the same output and the same cruising distance.

Further, an outboard motor is normally attached to overhang from a stern (transom board) of a hull to the outside. Thus, in the case when the electric outboard motor is used, not only the total weight of a hull is simply increased but also a barycenter of the hull is positioned at the rear. As a result, a bow of the hull rises during traveling to thereby affect the front view of a boat operator. In the above case, it is possible to consider that the boat operator moves to the front of the hull to maintain a weight balance of the hull, but the boat operator is away from the outboard motor to cause a fear that it becomes difficult for the boat operator to manipulate the electric outboard motor.

Further, when the weight of the electric outboard motor is increased, a tilt-up manipulation, which is performed when the electric outboard motor is brought up from the water, is not easily performed and portability of which the electric outboard motor is detached from the hull to be carried to a storage place is also reduced. Further, inertial mass at the time of traveling also increases, and thus when an underwater obstacle and the electric outboard motor collide at the time of traveling, a tilt-up operation for reducing impact weighting is not easily performed to cause a fear that impact weighting against the electric outboard motor increases. Further, the electric outboard motor is increased in size, and thus when the electric outboard motor is tilt-up manipulated, an overhang of the electric outboard motor toward the hull is increased to cause a fear that the overhang interferes with the hull or an occupied space of the electric outboard motor in the hull is increased.

SUMMARY OF THE INVENTION

The present invention has been made in view of problems as described above, and has an object to improve maneuverability of an electric outboard motor.

An electric outboard motor according to the present invention being an electric outboard motor to be driven by an electric motor, the electric outboard motor includes an electric outboard motor main body including the electric motor and a propulsion section that applies the electric motor as motive power and a power supply section supplying power to the electric motor, in which the electric outboard motor main body and the power supply suction are provided separately and are detachably connected by couplers via a cable.

Further, it is characterized in that the coupler of the cable is allowed to be attached and detached to and from the coupler on a side of the power supply section.

Further, it is characterized in that the power supply section includes a packaged battery pack and a battery pack attaching section disposed in a hull and having the battery pack attached and detached thereto and therefrom.

Further, it is characterized in that the power supply section includes the plurality of battery pack attaching sections and the battery pack is selectively allowed to be attached to at least one of the plurality of battery pack attaching sections.

Further, the electric outboard motor further includes a control section controlling the electric motor, in which the control section and the electric motor are communicably connected by a signal transmitting means.

Further, the electric outboard motor further includes a control section controlling the electric motor and a display section displaying a battery remaining amount of the battery pack thereon, in which the control section and the display section are communicably connected by a signal transmitting means.

DETAILED DESCRIPTION OF THE PREFERRED EMBODIMENTS

Hereinafter, a preferred embodiment of an electric outboard motor according to the present invention will be explained based on the drawings.

First Embodiment

Figure 1:
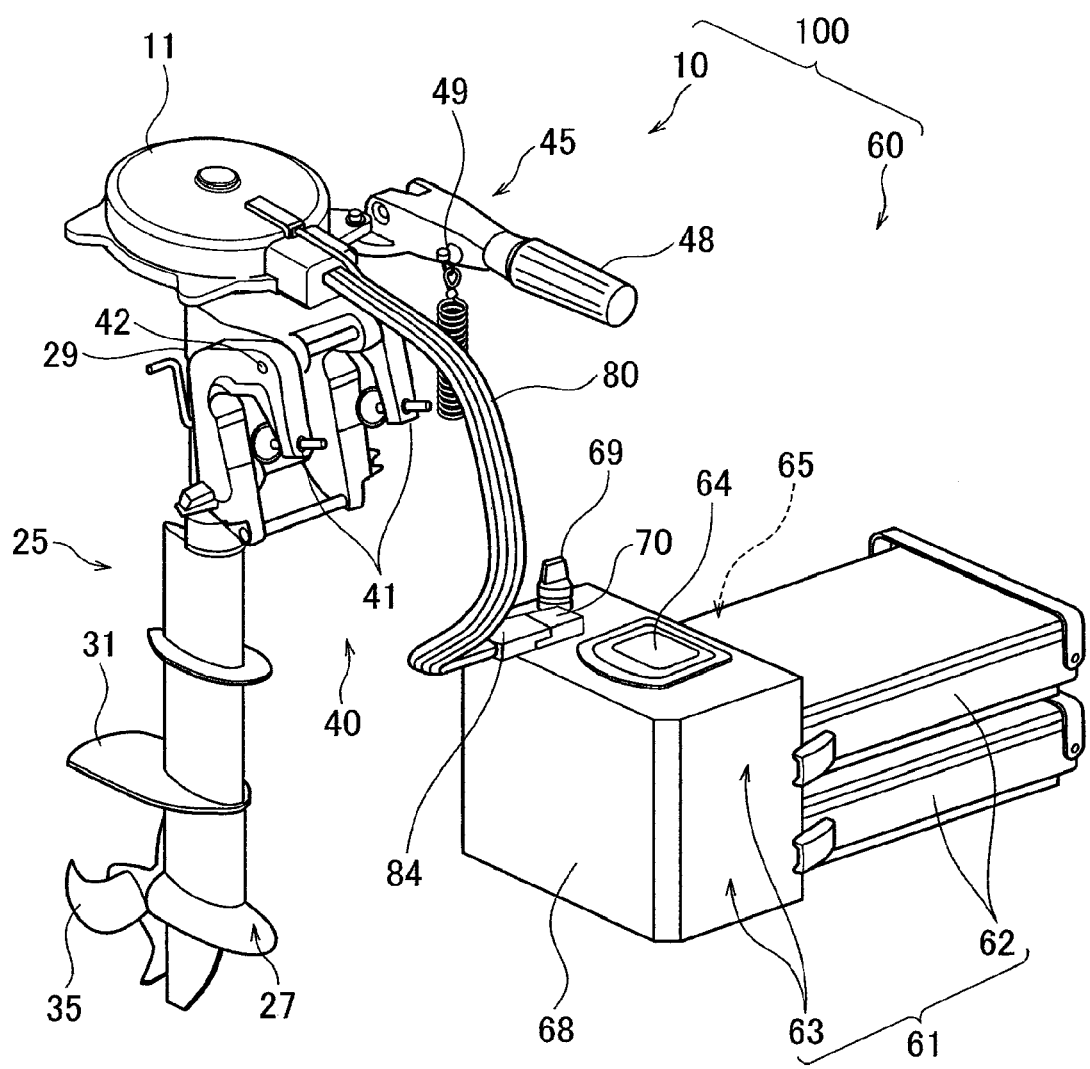
FIG. 1 is an appearance view of an electric outboard motor according to a first embodiment.
Figure 2:
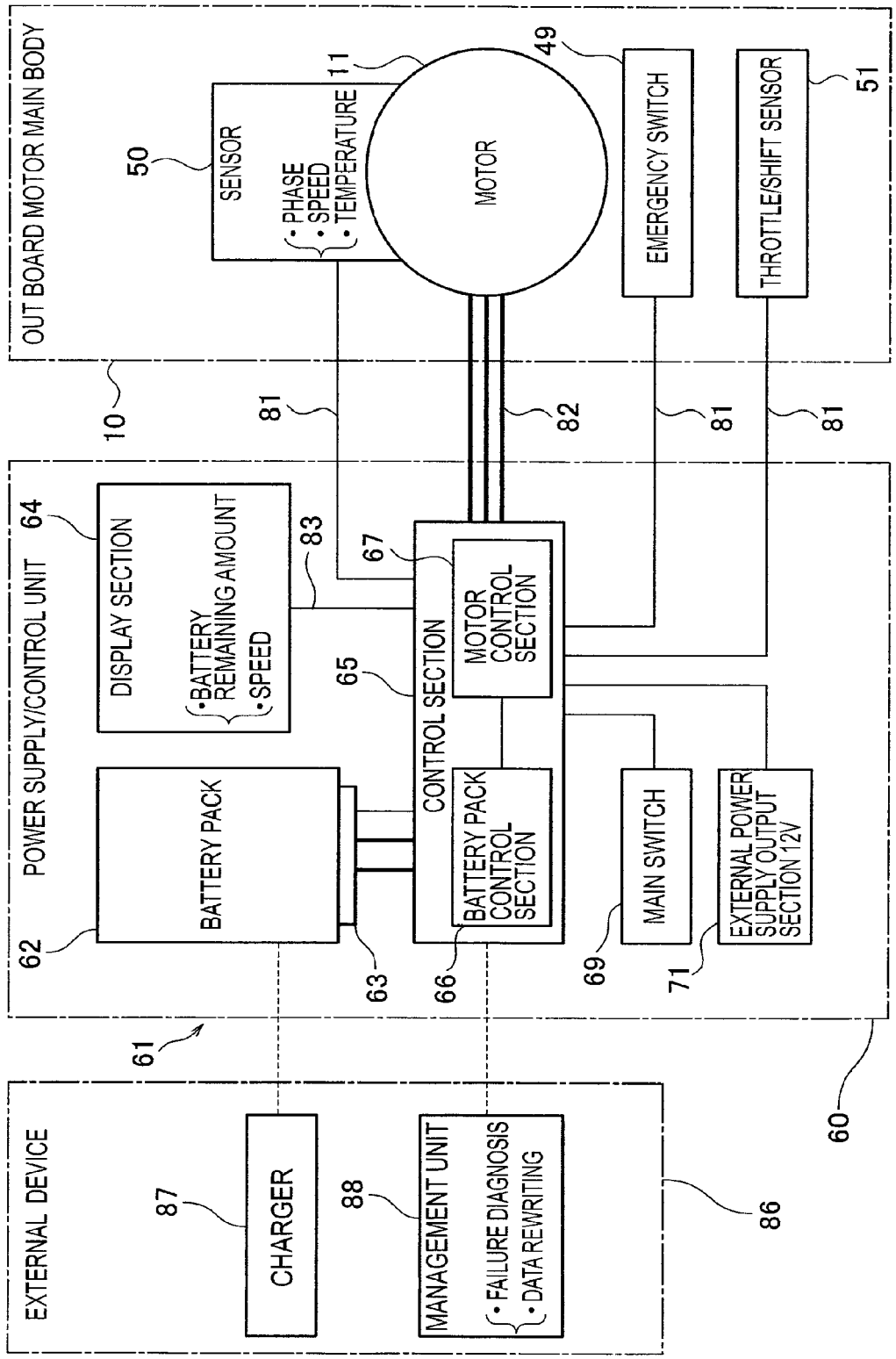
FIG. 2 is a view showing a configuration of an electric outboard motor system including the electric outboard motor.

The entire structure of an electric outboard motor 100 according to an embodiment will be explained with reference to FIG. 1 and FIG. 2. FIG. 1 is an appearance view of the electric outboard motor according to this embodiment, and FIG. 2 is a view showing an electric outboard motor system including the electric outboard motor.

As shown in FIG. 1, the electric outboard motor 100 is provided with an electric outboard motor main body 10 and a power supply/control unit 60, and the both are formed separately. Further, the electric outboard motor main body 10 and the power supply/control unit 60 are electrically connected by a cable 80. The electric outboard motor main body 10 and the power supply/control unit 60 are formed separately, thereby separating the power supply/control unit 60 from the electric outboard motor main body 10 to enable the power supply/control unit 60 to be disposed at a position where a barycenter balance in a hull is stabilized, resulting that it is possible to improve maneuverability of the electric outboard motor 100. Incidentally, in the drawings to be shown hereinafter, as necessary, the front of the electric outboard motor main body 10 is indicated by an arrow Fr, and the rear thereof is indicated by an arrow Rr, and the right side of the electric outboard motor main body 10 is indicated by an arrow R, and the left side thereof is indicated by an arrow L. Note that the front of the electric outboard motor main body 10 indicates a direction in which the hull travels forward in a state of the electric outboard motor main body 10 being attached to the hull.

Hereinafter, respective components of the electric outboard motor 100 will be explained in detail respectively.

Figure 3:
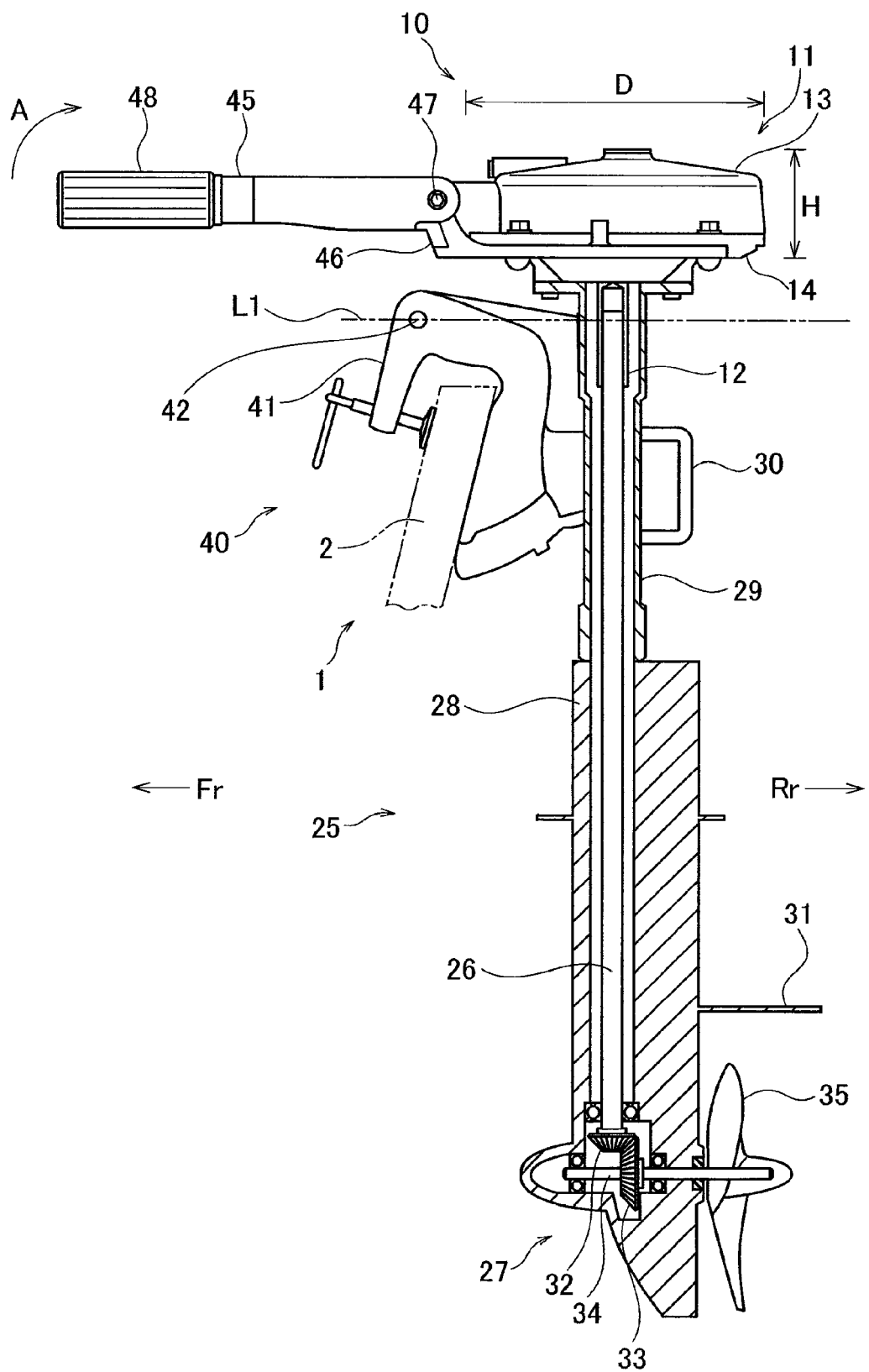
FIG. 3 is a partial side cross-sectional view of an electric outboard motor main body.

First, the structure of the electric outboard motor main body 10 will be explained with reference to FIG. 1 to FIG. 4. FIG. 3 is a partial side cross-sectional view of the electric outboard motor main body.

The electric outboard motor main body 10 has an electric motor 11, a propulsion section 25, a hull attaching section 40, and a steering handle 45.

The electric motor 11 is a power source for the electric outboard motor main body 10, namely for rotating a propeller 35 of the propulsion section 25. A permanent magnet type synchronous motor is used for the electric motor 11 in this embodiment. As shown in FIG. 3, in the state of the electric outboard motor main body 10 being attached to the hull, the electric motor 11 is disposed so that an output shaft 12 expends in a vertical and downward direction. Further, a shape of the electric motor 11 is formed in a substantially flat shape in which a horizontal direction dimension D is made larger than a height dimension H. Thus, the electric motor 11 is formed to be able to output high torque at low speed as compared with an electric motor that is not formed in a flat shape.

Further, the electric motor 11 itself is formed in a watertight manner and the electric motor 11 is disposed to be exposed to the outside. Here, the watertight structure of the electric motor 11 will be explained with reference to a cross-sectional view of the electric motor shown in FIG. 4.

Figure 4:
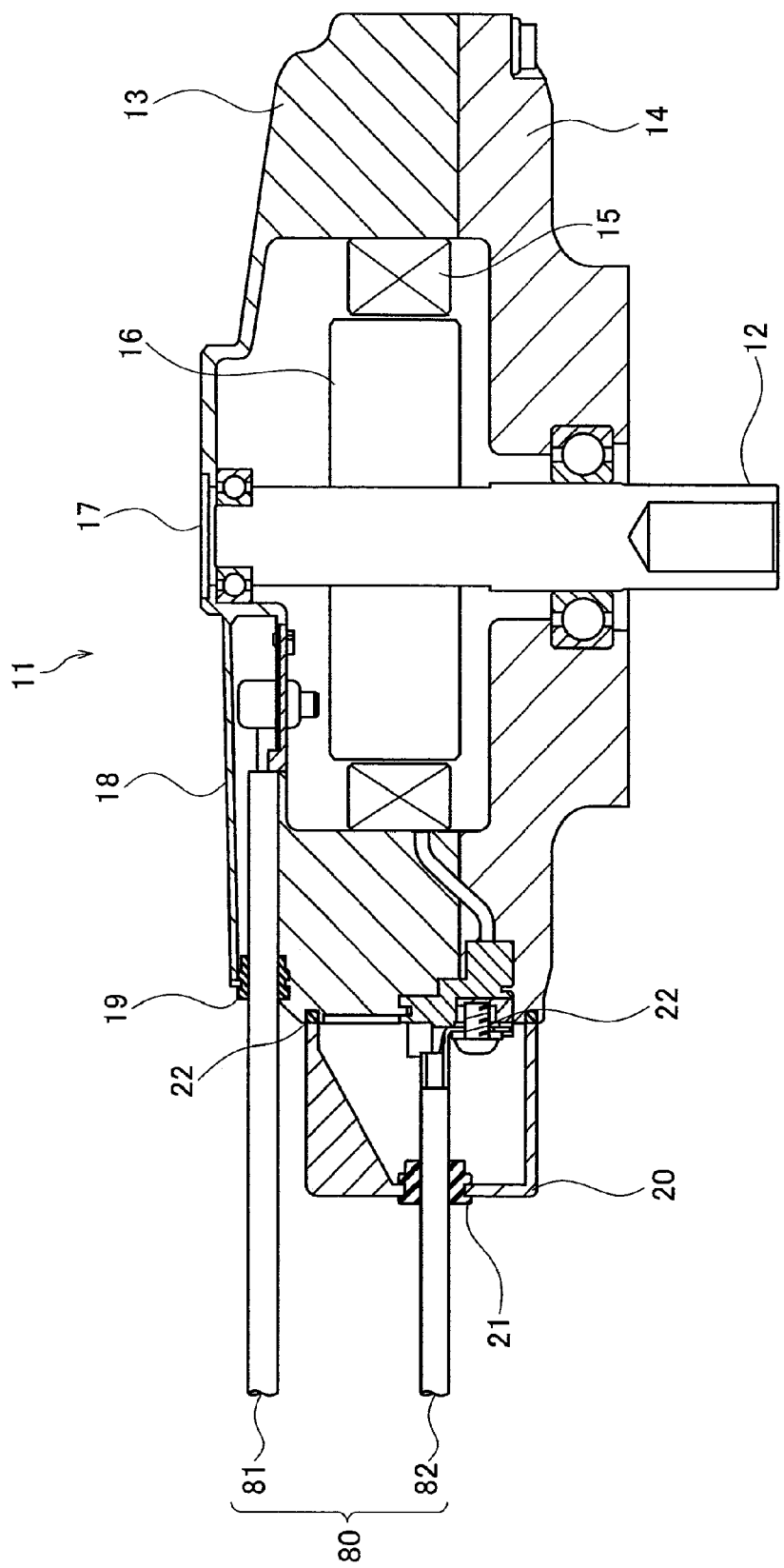
FIG. 4 is a cross-sectional view of an electric motor.

As shown in FIG. 4, the electric motor 11 has a permanent magnet 15 and a rotor 16 provided between an upper housing 13 and a lower housing 14 in a state where they are shielded from the outside. An upper portion of the upper housing 13 has an opening that communicates with the outside sealed with a sealing member 17.

Further, as the cable 80 wired from the power supply/control unit 60, a signal cable 81 and a power supply cable 82 are connected to the electric motor 11. A connection portion of the electric motor 11 with the signal cable 81 is covered with a signal cable cover 18. Of the signal cable cover 18, an opening into which the signal cable 81 is inserted is sealed with a sealing member 19. Further, a connection portion of the electric motor 11 with the power supply cable 82 is covered with a power supply cable cover 20. Of the power supply cable cover 20, an opening into which the power supply cable 82 is inserted and a portion attached to the electric motor 11 are sealed with sealing members 21, 22 respectively. The electric motor 11 itself is formed in an airtight manner as above, and thereby water does not enter the electric motor 11 to enable the electric motor 11 to be disposed in a state of being exposed to the outside. Thus, the electric motor 11 is directly exposed to the outside air to improve cooling efficiency, so that an air cooled type with a simple structure is employed for cooling down the electric motor 11 in this embodiment.

The propulsion section 25 converts output of the electric motor 11 into force of propelling the hull. The propulsion section 25 is formed to include a drive shaft 26, a gear case 27, a drive shaft housing 28, a swivel bracket 29, and the propeller 35.

As shown in FIG. 3, the drive shaft 26 is coupled to the output shaft 12 of the electric motor 11 and extends vertically downward to the gear case 27. The drive shaft 26 is coaxial with the output shaft 12 and rotates in synchronization with the output shaft 12. The periphery of the above drive shaft 26 is surrounded by the drive shaft housing 28.

An upper portion of the drive shaft housing 28 is coupled to the lower housing 14 of the electric motor 11. Further, an upper portion from a substantially intermediate portion of the drive shaft housing 28 is supported by the swivel bracket 29 to be able to pivot in a horizontal direction. A pivot shaft about which the drive shaft housing 28 pivots in the horizontal direction is coaxial with the drive shaft 26.

Further, the swivel bracket 29 has one portion project forward and has the hull attaching section 40 attached thereto, and has a carrying handle 30 for carrying the electric outboard motor main body 10 formed on the rear. Further, at a lower portion of the drive shaft housing 28, namely on a propeller 35 side, a cavitation plate 31 for preventing the propeller 35 from drawing in the air is formed.

The gear case 27 has various gears that convert a rotation direction of the drive shaft 26 into a perpendicular direction, and the like housed therein. Concretely, in the gear case 27, a first bevel gear 32 coupled to a tip of the drive shaft 26, a second bevel gear 33 engaging with the first bevel gear 32, and a propeller shaft 34 coupled to the second bevel gear 33 are included. The propeller shaft 34 has the propeller 35 that rotates in synchronization with the propeller shaft 34 coupled to a rear end. The drive shaft 26 rotates the propeller shaft 34 via the first bevel gear 32 and the second bevel gear 33, and thereby the propeller 35 rotates.

As described above, the electric motor 11 outputs high torque at low speed, so that output of the output shaft 12 of the electric motor 11 is directly connected to the drive shaft 26 without a speed reducer being interposed therebetween. Thus, it is possible to simplify the structure of the propulsion section 25 and to reduce a noise to be caused when the output shaft 12 engages with a speed reducer. Further, the electric motor 11 outputs high torque at low speed, so that a speed reduction ratio from the first bevel gear 32 to the second bevel gear 33 can be reduced. That is, the second bevel gear 33 can be made small, so that it is possible to make the gear case 27 small accordingly and to reduce underwater resistance to the gear case 27 at the time of traveling.

The hull attaching section 40 has a pair of clamp brackets 41 connected to the swivel bracket 29. As shown in FIG. 3, the clamp brackets 41 are fastened and fixed to a transom board 2 (see a two-dot chain line shown in FIG. 3) of a hull 1, and thereby the electric outboard motor main body 10 is attached to the hull 1. The clamp brackets 41 are supported to the swivel bracket 29 to be able to pivot about a tilt pin 42 suspended along a right/left direction. Thus, in a state of the clamp brackets 41 being fixed to the transom board 2, it is possible to perform what is called a tilt-up manipulation in which the propulsion section 25 is brought up from the water pivotally about the tilt pin 42.

In this embodiment, as shown in FIG. 3, the electric motor 11 being a heavy object is positioned higher than a horizontal line (see a two-dot chain line L1 shown in FIG. 3) passing the tilt pin 42, concretely is diagonally positioned rearward and upward of the tilt pin 42. Thus, a boat operator can easily perform the tilt-up manipulation.

The steering handle 45 is a handle for a steering manipulation in which the boat operator steers the traveling direction of the hull. As shown in FIG. 3, the steering handle 45 is integrally attached to the electric motor 11 via a handle bracket 46 and extends forward from a side of the electric motor 11. Further, the steering handle 45, when seen from a side surface, is disposed at a height position overlapping the electric motor 11, concretely upper surfaces of the steering handle 45 and the electric motor 11 are disposed at substantially the same height position. As described above, the electric motor 11 is in a substantially flat shape, namely thin, and the upper surface is kept low. Thus, the steering handle 45 positioned at substantially the same height as the upper surface of the electric motor 11 is also disposed low to thereby enable an overall height of the electric outboard motor main body 10 to be reduced. Consequently, the boat operator can obtain the rear view of the electric outboard motor main body 10 extensively when manipulating the steering handle 45.

Note that the steering handle 45 and the handle bracket 46 are connected via a pivot pin 47. Thus, the steering handle 45 can pivot about the pivot pin 47 in an arrow A direction shown in FIG. 3, and can be folded to the side of the electric motor 11.

In the case when the boat operator steers the traveling direction of the hull, the boat operator turns the steering handle 45 in the horizontal direction, and thereby the electric motor 11 pivots in the horizontal direction integrally with the steering handle 45, and in synchronization with the above, the drive shaft housing 28 supported by the swivel bracket 29 and the propeller 35 change the direction in the horizontal direction, and thereby the traveling direction of the hull 1 changes.

Further, a throttle grip 48 is provided on a tip of the steering handle 45. The boat operator adjusts a direction (shift direction) and an amount (a throttle amount) of which the throttle grip 48 is twisted, and thereby information on the traveling direction and acceleration and deceleration are transmitted to the power supply/control unit 60. Further, as shown in FIG. 1, to a side surface of the steering handle 45, an emergency switch 49 for emergency stopping is attached.

Other internal structures of the electric outboard motor main body 10 will be explained with reference to FIG. 2. The electric outboard motor main body 10 is provided with a sensor 50 detecting a state of the electric motor 11 (a phase, a rotation speed, a temperature, and so on of the electric motor 11). The sensor 50 transmits detected information to the power supply/control unit 60 via the signal cable 81. Further, the electric outboard motor main body 10 is provided with a throttle/shift sensor 51 detecting a manipulated state (the shift direction and throttle amount) of the throttle grip 48. The throttle/shift sensor 51 transmits detected information to the power supply/control unit 60 via the signal cable 81. Further, in the electric outboard motor main body 10, information in which the emergency switch 49 is turned on is also transmitted to the power supply/control unit 60 via the signal cable 81.

Figure 5:
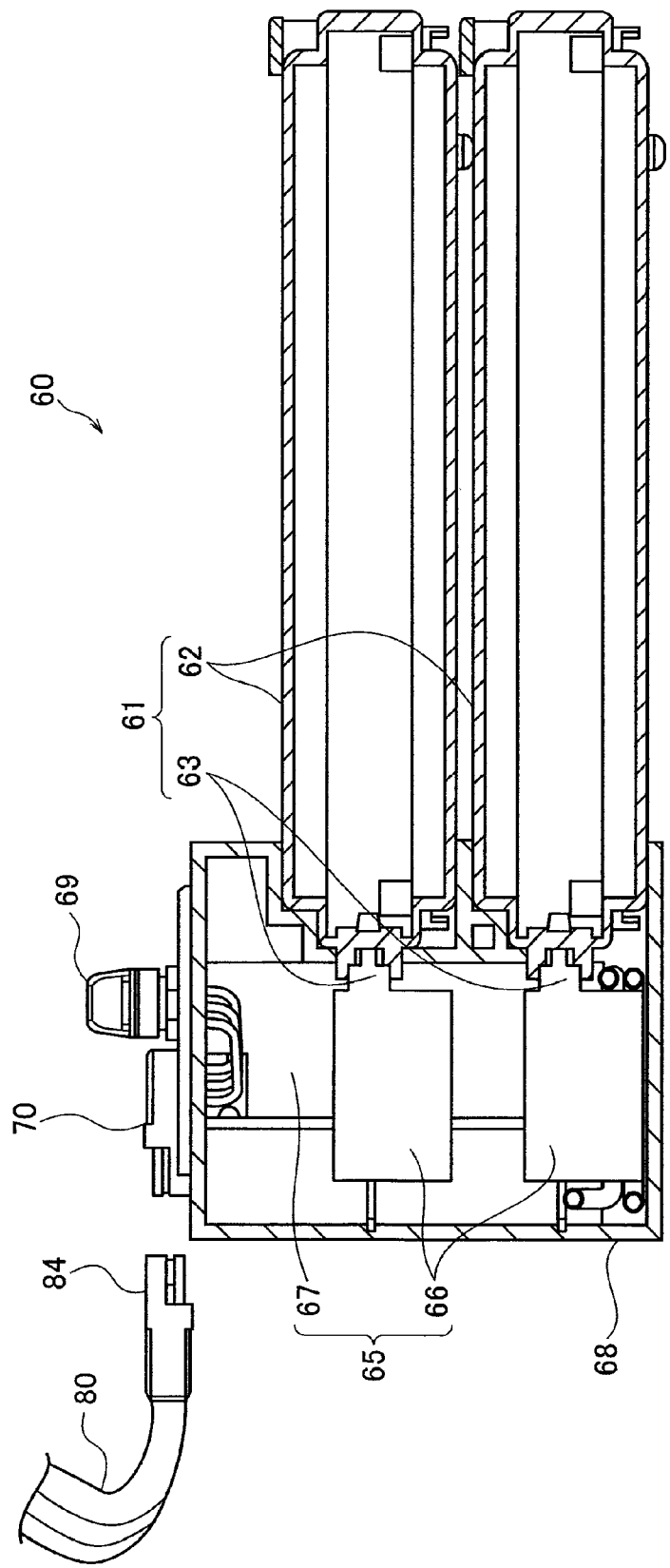
FIG. 5 is a side cross-sectional view of a power supply/control unit.

Next, the power supply/control unit 60 will be explained with reference to FIG. 1 and FIG. 5. FIG. 5 is a side cross-sectional view of the power supply/control unit.

The power supply/control unit 60 is formed in a manner that a power supply section 61, a display section 64, and a control section 65 are integrated by a unit case 68.

As shown in FIG. 5, the power supply section 61 is provided with packaged battery packs (batteries) 62 for supplying power to the electric motor 11 and battery pack attaching sections 63 provided on a side surface of the unit case 68 and having the battery packs 62 to be attached thereto. The power supply section 61 in this embodiment is provided with the two battery pack attaching sections 63 so as to enable the two battery packs 62 to be attached thereto simultaneously.

The battery pack 62 is formed in a manner that a set of lithium ion battery cells is stored in a case, and the boat operator can detach the battery pack 62 from the battery pack attaching section 63 to carry it. The battery pack 62 is charged by a later-described charger, and thereby it can be used repeatedly.

Figure 6A:
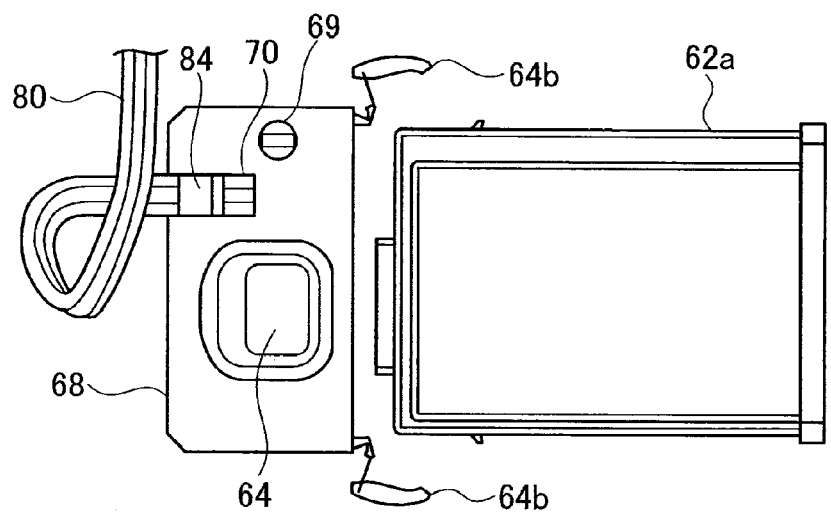
FIG. 6A is a plan view for explaining a method of attaching a battery pack.
Figure 6B:
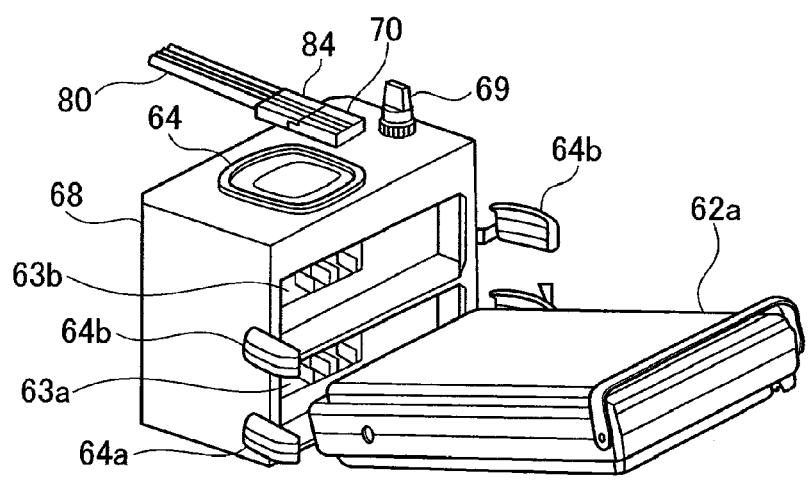
FIG. 6B is a perspective view for explaining the method of attaching the battery pack.
Figure 6C:
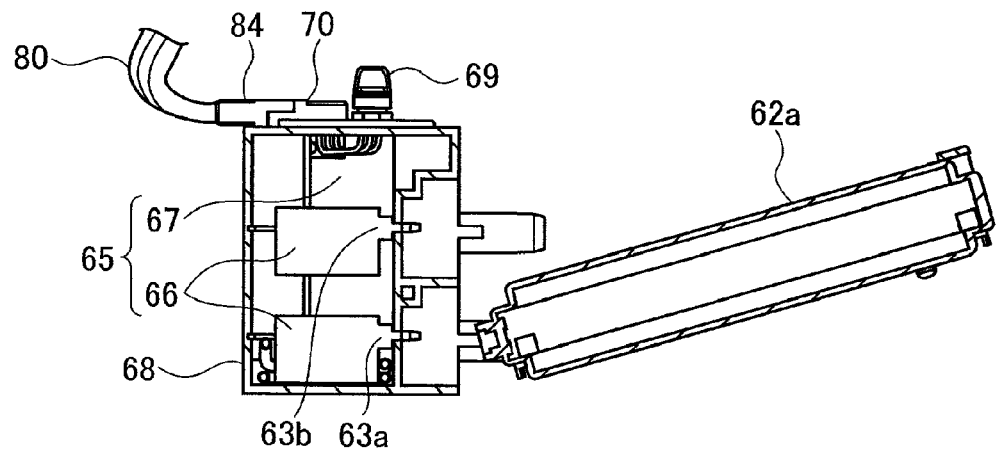
FIG. 6C is a side cross-sectional view for explaining the method of attaching the battery pack.

The boat operator can selectively attach the single battery pack 62 or the plurality of battery packs 62 to the two battery pack attaching sections 63. FIG. 6A to FIG. 8C are views showing states until the two battery packs 62 are attached to the two battery pack attaching sections 63. FIG. 6A to FIG. 6C are a plan view, a perspective view, and a side cross-sectional view showing the state where a battery pack 62*a* is to be attached to a first battery pack attaching section 63*a*.

Figure 7A:
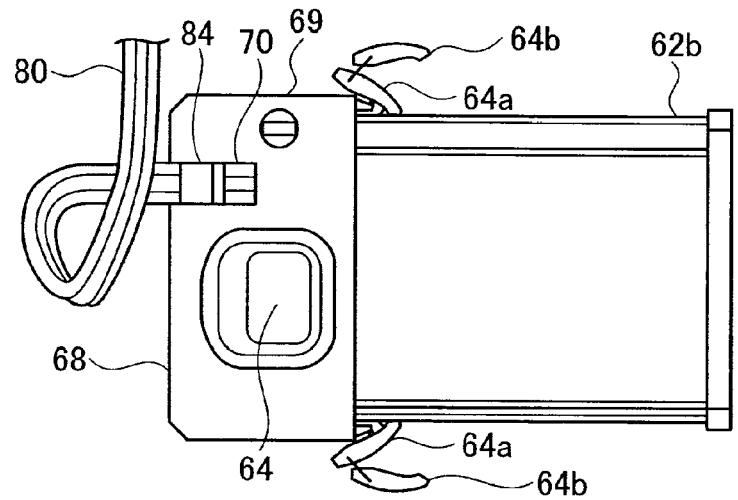
FIG. 7A is a plan view for explaining the method of attaching the battery pack.
Figure 7B:
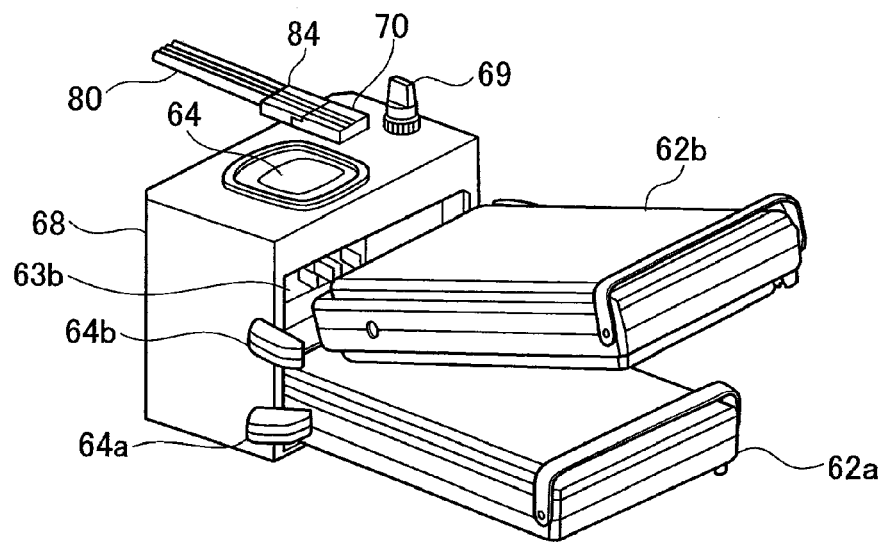
FIG. 7B is a perspective view for explaining the method of attaching the battery pack.
Figure 7C:
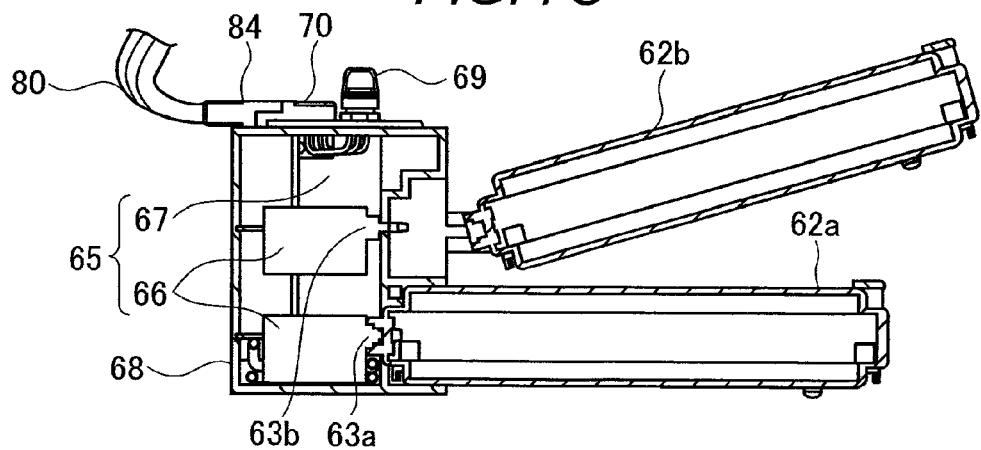
FIG. 7C is a side cross-sectional view for explaining the method of attaching the battery pack.
Figure 8A:
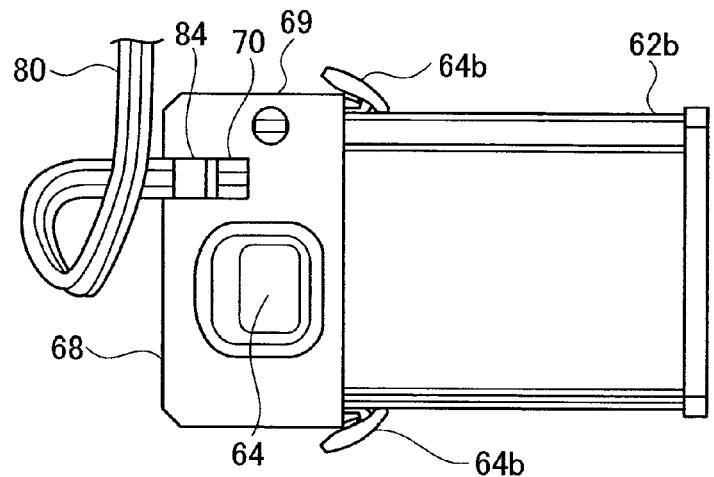
FIG. 8A is a plan view for explaining the method of attaching the battery pack.
Figure 8B:
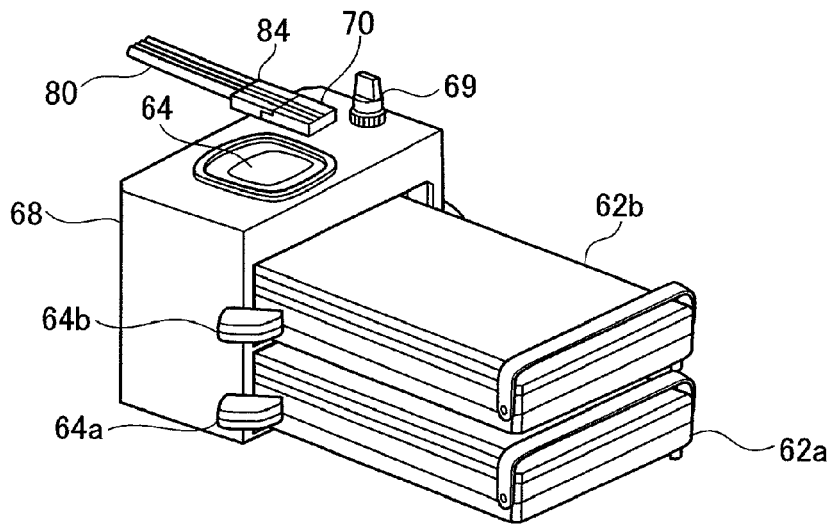
FIG. 8B is a perspective view for explaining the method of attaching the battery pack.
Figure 8C:
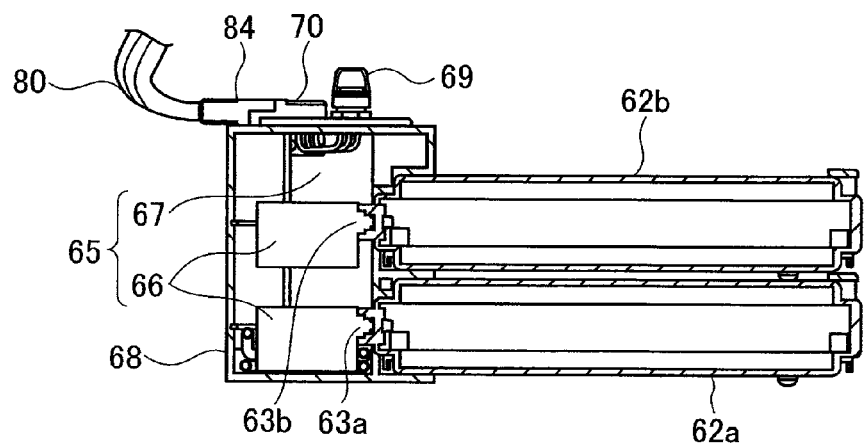
FIG. 8C is a side cross-sectional view for explaining the method of attaching the battery pack.

FIG. 7A to FIG. 7C are a plan view, a perspective view, and a side cross-sectional view showing the state where in the state of the battery pack 62a being coupled to the first battery pack attaching section 63a, the battery pack 62a is locked by first fixing/fastening parts 64a and the state where a battery pack 62b is to be attached to a second battery pack attaching section 63b. FIG. 8A to FIG. 8C are a plan view, a perspective view, and a side cross-sectional view showing the state where in the state of the battery packs 62a, 62b being coupled to the first battery pack attaching section 63a and second battery pack attaching section 63b respectively, the battery pack 62a is locked by the first fixing/fastening parts 64a and the battery pack 62b is locked by second fixing/fastening parts 64b.

In this manner, the single battery pack 62 is attached to each of the battery pack attaching sections 63, so that the boat operator can selectively attach the battery pack 62 to the two battery pack attaching sections 63. That is, the boat operator may also attach the battery pack 62 to only one of the first battery pack attaching section 63a and the second battery pack attaching section 63b, or may also attach the battery packs 62 to both the first battery pack attaching section 63a and the second battery pack attaching section 63b.

Incidentally, in this embodiment, the case where the two battery pack attaching sections 63 are provided is explained, but the present invention is not limited to the above case, and three or more of the battery pack attaching sections may also be provided, or only the single battery pack attaching section may also be provided. In the case when three or more of the battery pack attaching sections are provided, it is possible to form the power supply/control unit 60 so that the boat operator can selectively attach the battery pack to at least one of three or more of the battery pack attaching sections.

In the state of the battery pack 62 being attached to the battery pack attaching section 63, power for driving the electric motor 11 is allowed to be supplied from the battery pack 62.

As above, it is formed so that the battery pack 62 can be attached and detached to and from the battery pack attaching section 63, and thereby when the electric outboard motor 100 is not used, it is possible to detach the battery pack 62 from the battery pack attaching section 63 and to easily perform maintenance of the battery pack 62. Further, it is possible to quickly replace the battery pack 62 having no remaining amount with the charged battery pack 62, resulting that the battery pack 62 can be used efficiently. That is, the charged battery pack 62 is always attached to the battery pack attaching section 63, thereby enabling an operating rate of the boat to be improved. Further, it is also possible to change a size of the battery pack 62 depending on intended uses.

Further, in order to enable the battery pack 62 to be selectively attached to at least one of the plurality of battery pack attaching sections 63, it is possible to change the number of the battery packs 62 to be attached depending on intended uses. Further, two or more of the battery packs 62 are attached to the plurality of battery pack attaching sections 63, and thereby the battery pack 62 or the battery packs 62 can be set as a standby power supply when the remaining amount of the single battery pack 62 runs out during cruising.

The display section 64 is disposed on an upper surface of the unit case 68 as shown in FIG. 1. On the display section 64, the battery remaining amount of the battery pack 62, the rotation speed of the electric motor 11, and so on are displayed by using, for example, scales (gauges). The contents to be displayed on the display section 64 are controlled by the control section 65. Incidentally, the display section 64 and the control section 65 are communicably connected via a signal cable 83 (see FIG. 2) as a signal transmitting means.

The control section 65 is provided inside the unit case 68 as shown in FIG. 5 to have battery pack control sections (power supply control sections) 66 that control the battery packs 62 and a motor control section 67 that controls the electric motor 11. Each of the battery pack control sections 66 detects whether or not the battery pack 62 is attached to the battery pack attaching section 63, and acquires information of the battery remaining amount of the attached battery pack 62 to transmit the information to the motor control section 67. The motor control section 67 is formed to include an inverter, controls power to be supplied to the electric motor 11, and transmits information to be displayed on the display section 64 to the display section 64.

The motor control section 67, based on programs stored in a memory (that is not illustrated), controls the electric motor 11, display section 64, and so on. For example, the motor control section 67, based on the phase, rotation speed, and temperature of the electric motor 11 that are acquired from the sensor 50 and the shift direction and throttle amount of the throttle grip 48 that are acquired from the throttle/shift sensor 51, which are described above, controls power to be supplied to the electric motor 11. Further, in the case when the plurality of battery packs 62 are attached to the battery pack attaching sections 63, the motor control section 67 switches the battery pack 62 that is to supply power to the electric motor 11, depending on the battery remaining amount. Further, the motor control section 67 stops the power supply to the electric motor 11 when the emergency switch 49 is turned on.

The power supply/control unit 60 is provided with a main switch 69. The main switch 69 is disposed on the upper surface of the unit case 68. When the boat operator turns the main switch 69 on, the motor control section 67 reads the program and a preparation for driving the electric motor 11 is set. Further, when the boat operator turns the main switch 69 off, the power supply to the electric motor 11 is stopped and processing by the power supply/control unit 60 is stopped.

The power supply/control unit 60 is provided with a coupler 70 connecting the cable 80 on a power supply/control unit 60 side. The coupler 70 is disposed on the upper surface of the unit case 68, and is attachable and detachable to and from a coupler 84 coupled to an end portion of the cable 80.

Other internal structures of the power supply/control unit 60 will be explained with reference to FIG. 2. The power supply/control unit 60 is provided with an external power supply output section 71. A voltage 12V is output from the external power supply output section 71, and the external power supply output section 71 can have a device that requires a power supply connected thereto. In the external power supply output section 71, required power is supplied to a connected device from the battery pack 62.

Next, the cable 80 will be explained. The cable 80 electrically connects the electric outboard motor main body 10 and the power supply/control unit 60. The cable 80 is formed in a manner that the plurality of signal cables 81 transmitting/receiving information between the electric outboard motor main body 10 and the power supply/control unit 60 and the power supply cable 82 supplying power in the battery pack 62 are both covered in a watertight manner. A material excellent in flexibility is used for the cable 80 and a covering material covering the cable 80. Thus, even when the tilt-up manipulation and the steering manipulation of the electric outboard motor main body 10 are performed in a state of the cable 80 being connected to the electric outboard motor main body 10 and the power supply/control unit 60, the cable 80 easily bends, resulting that the signal transmission and the power supply are not affected.

Further, one end portion of the cable 80 on an electric outboard motor main body 10 side is connected to the electric motor 11 in a watertight state as described above. On the other hand, the other end portion of the cable 80 on the power supply/control unit 60 side has the coupler 84 that corresponds to the coupler 70 on the power supply/control unit 60 side coupled thereto, thereby making the connection between the cable 80 and the power supply/control unit 60 easily detachable.

Since the attachment and detachment between the cable 80 and the power supply/control unit 60 can be easily performed in this manner, the electric outboard motor main body 10 and the power supply/control unit 60 can be easily separated. Thus, it is possible to separately attach and detach the electric outboard motor main body 10 and the power supply/control unit 60 to and from the hull 1 respectively, so that usability of the electric outboard motor 100 is improved.

Further, as shown in FIG. 2, in the electric outboard motor system, as an external device 86, a charger 87 charging the battery pack 62 and a management unit 88 performing maintenance and the like of the power supply/control unit 60 are provided. Normally, the charger 87 and the management unit 88 are placed at a place different from the hull, which is a marina, a home, or the like. The charger 87 charges the battery pack 62 detached from the battery pack attaching section 63 in the power supply section 61. Incidentally, the charger 87 may also be one capable of charging the battery pack 62 in a state of the battery pack 62 being attached to the power supply/control unit 60.

The management unit 88 being a terminal device provided with a computer, for example, is connected to the power supply/control unit 60 and can perform failure diagnosis. Further, the management unit 88 can rewrite the programs stored in the control section 65 into programs according to the cruise by the boat operator.

Figure 9A:
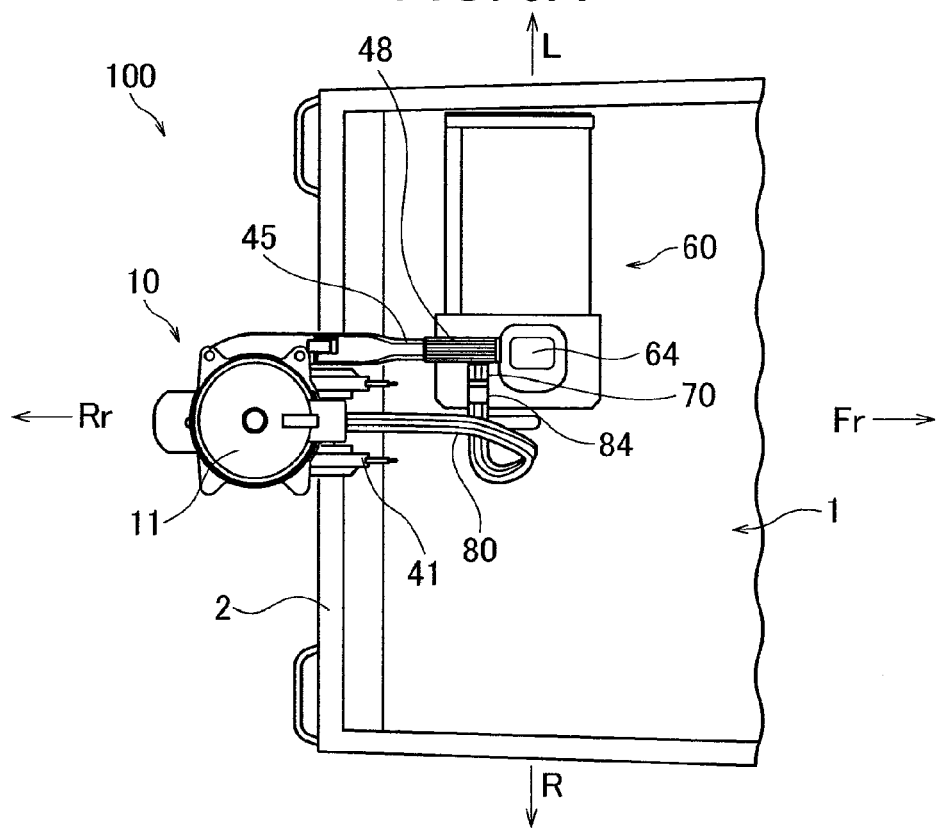
FIG. 9A is a plan view showing a state of the electric outboard motor being attached to a hull.
Figure 9B:
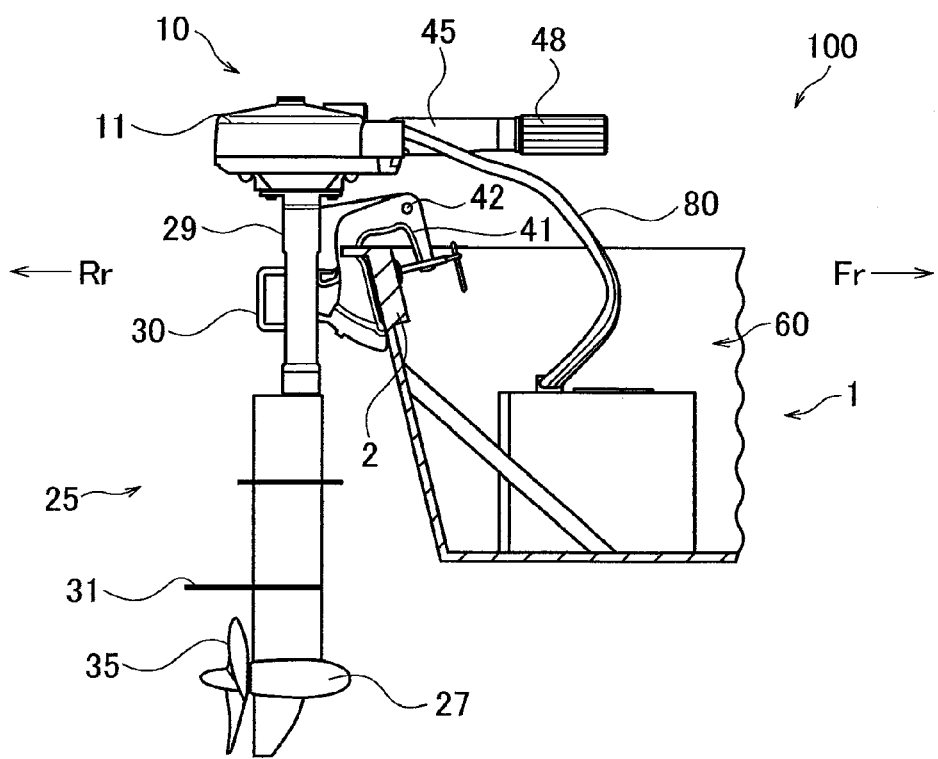
FIG. 9B is a side cross-sectional view showing the state of the electric outboard motor being attached to the hull.

Next, the case when the electric outboard motor 100 formed as described above is attached to the hull will be explained with reference to FIG. 9A and FIG. 9B. FIG. 9A is a plan view of a state of the electric outboard motor 100 being attached to the hull. FIG. 9B is a side cross-sectional view in which a part of the hull 1 is cut off in the state of the electric outboard motor 100 being attached to the hull.

The electric outboard motor main body 10 and the power supply/control unit 60 are formed separately, thereby enabling the power supply/control unit 60 to be disposed without restraint. In this embodiment, as shown in FIG. 9A and FIG. 9B, it is possible that the electric outboard motor main body 10 is attached to the transom board 2 of the hull 1 via the clamp brackets 41 and the power supply/control unit 60 is disposed in the hull 1. In the state of the electric outboard motor main body 10 being attached to the transom board 2, as shown in the plan view of FIG. 9A, a part of a front portion of the electric motor 11 overlaps the transom board 2. Incidentally, in this embodiment, as shown in FIG. 9A, the power supply/control unit 60 is disposed on a boat bottom of the rear left side (a port side) of the hull 1.

In the hull 1 where the electric outboard motor 100 is disposed as described above, the boat operator is seated on the rear right side (a starboard side) of the hull 1, grips the throttle grip 48 with his/her left hand, and steers while facing his/her entire body or face to the front within a range where the boat operator can steer the steering handle 45.

Since the power supply/control unit 60 is disposed in the hull 1 in this manner, a barycenter of the hull 1 is positioned at the front. Thereby, a bow of the hull 1 during traveling does not rise and the boat operator's front view is well maintained, resulting that the maneuverability of the electric outboard motor 100 is improved. Further, the bow of the hull 1 during traveling does not rise, thereby reducing air resistance at the time of traveling, so that acceleration performance and planing performance of the hull 1 are improved.

Further, the power supply/control unit 60 is disposed in the hull 1, which makes it difficult to expose the power supply/control unit 60 susceptible to water to the water to enable a waterproof property of the electric outboard motor 100 to be improved. Further, the power supply/control unit 60 is disposed in a trunk room (that is not illustrated) of the hull 1, thereby enabling the waterproof property of the electric outboard motor 100 to be further improved.

Further, the electric outboard motor main body 10 and the power supply/control unit 60 are separable via the cable 80 and they are lightweight respectively, so that it is possible to easily attach and detach them to and from the hull 1. Further, portability of which the electric outboard motor main body 10 and the power supply/control unit 60 are carried to a storage place or the like is improved.

Further, the cable 80 is attachable and detachable between the coupler 70 disposed on the power supply/control unit 60 side and the coupler 84 of the cable 80. That is, the attachment and detachment of the cable 80 are performed on a hull 1 side that is not easily exposed to the water, and thus it is possible to prevent a leak and to improve the waterproof property of the electric outboard motor 100.

Further, the power supply/control unit 60 is disposed in the hull 1 that is not easily exposed to the water, and thereby only the electric motor 11 can be set to the component required to be waterproofed in the electric outboard motor main body 10. Thus, the electric motor 11 itself is formed in a watertight manner, thereby eliminating a need to apply a waterproof cover to the electric outboard motor main body 10 and enabling the electric motor 11 to be exposed to the outside. Thus, the electric motor 11 is directly exposed to the outside air to enable the cooling efficiency in which heat to be generated when the electric motor 11 is driven is cooled down to be improved. Further, the electric motor 11 can employ the air cooled type with a simple structure, and structure simplification, reduction in size, and reduction in weight of the electric outboard motor main body 10 can be achieved.

The structure of the electric outboard motor main body 10 is simplified, thereby reducing the number of components and improving safety and reliability of the electric outboard motor main body 10. Further, the electric outboard motor main body 10 is reduced in size, thereby enabling the boat operator to easily board and get off the boat from the vicinity of the transom board 2, for example, and further, also in the case when fishing or the like is performed in the hull 1, a fishing rod, a fishing line or the like is not easily caught on the electric outboard motor main body 10. In this manner, the electric outboard motor 100 can improve usability and comfort of the hull 1. Incidentally, a waterproof cover is not applied to the electric outboard motor 100, and thereby even when the electric outboard motor main body 10 is kept in a state of being placed horizontally, there is no need for scratch prevention for the cover and to improve rigidity of the cover.

Further, since, in the power supply/control unit 60, the control section 65 and the display section 64 are communicably connected via the signal cable 83, the degree of freedom of which the display section 64 is disposed expands to enable the display section 64 to be disposed at a position easily seen by the boat operator. Particularly, in this embodiment, the display section 64 is integrally disposed on the unit case 68 of the power supply/control unit 60, namely is disposed in the hull 1, and thereby the boat operator can visually recognize the display section 64 easily in a seated posture, for example.

Further, in the electric outboard motor 100, the electric motor 11 and the control section 65 are communicably connected via the signal cable 81. Thus, in the control section 65, for example, phase information of the rotor 16 in the electric motor 11 can be acquired, so that a three-phase motor can be used for the electric motor 11, or the like, which means that a range of types of a usable electric motor extends and control with high precision can be performed to the electric motor 11.

Next, the case when the tilt-up manipulation and the steering manipulation are performed to the electric outboard motor main body 10 attached to the hull 1 will be explained with reference to FIG. 10A to FIG. 12B. Incidentally, in each of the drawings, a hypothetical outboard motor 90 equipped with an electric motor, a battery, a control section and so on that are not illustrated is illustrated at a position of the electric motor 11 in this embodiment with a two-dot chain line so that an effect of the electric outboard motor main body 10 in this embodiment can be easily understood.

Figure 10A:
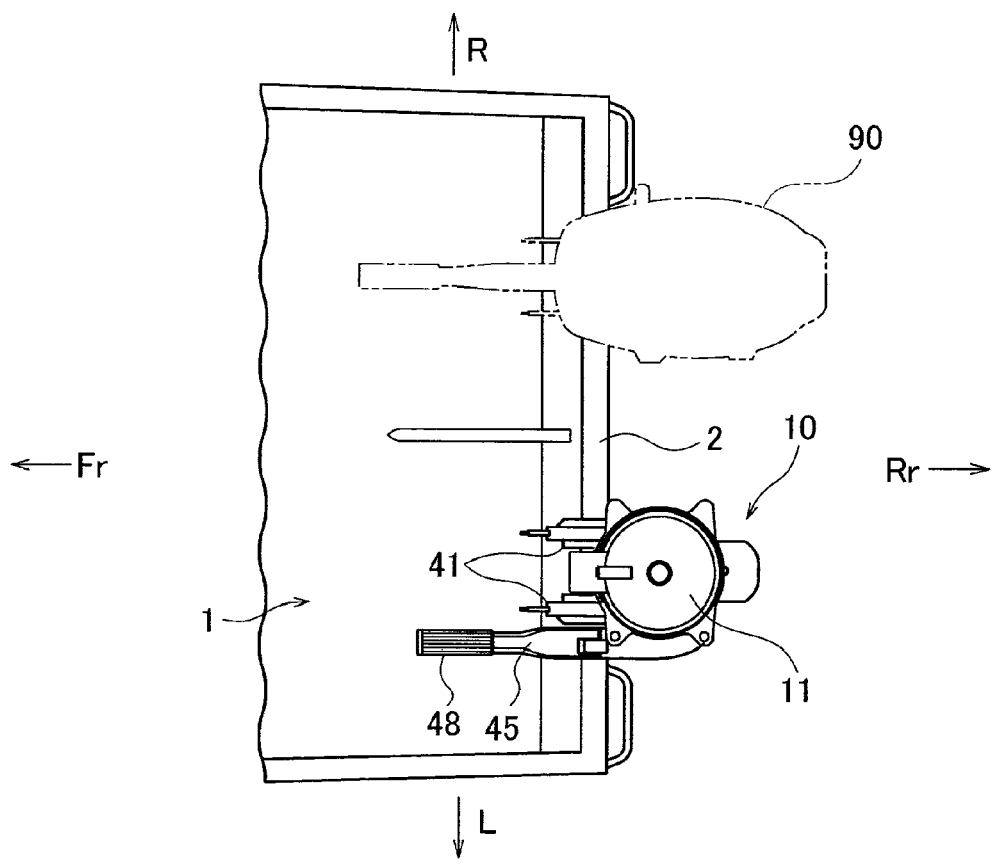
FIG. 10A is a plan view showing a state before the electric outboard motor main body is tilt-up manipulated.
Figure 10B:
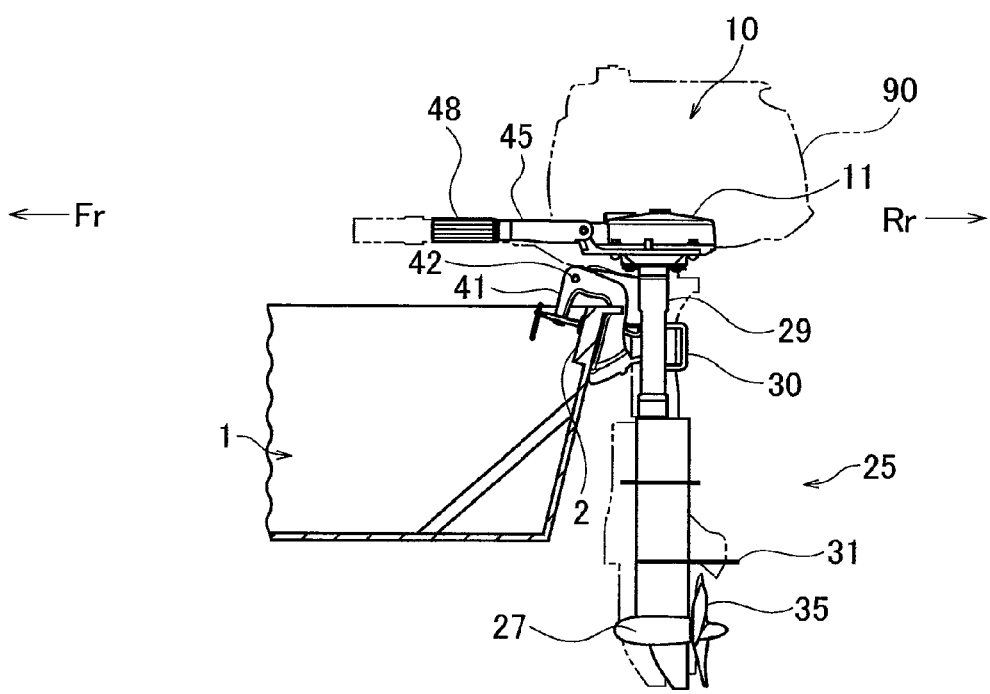
FIG. 10B is a side view showing the state before the electric outboard motor main body is tilt-up manipulated.

FIG. 10A and FIG. 10B are a plan view and a side view showing a state before the electric outboard motor main body 10 is tilt-up manipulated. As shown in FIG. 10A and FIG. 10B, the electric outboard motor main body 10 in this embodiment is such that the electric motor 11 in a substantially flat shape is only disposed on the upper portion of the swivel bracket 29. Thus, the electric outboard motor main body 10 is extremely small in size as compared with the outboard motor 90.

Figure 11A:
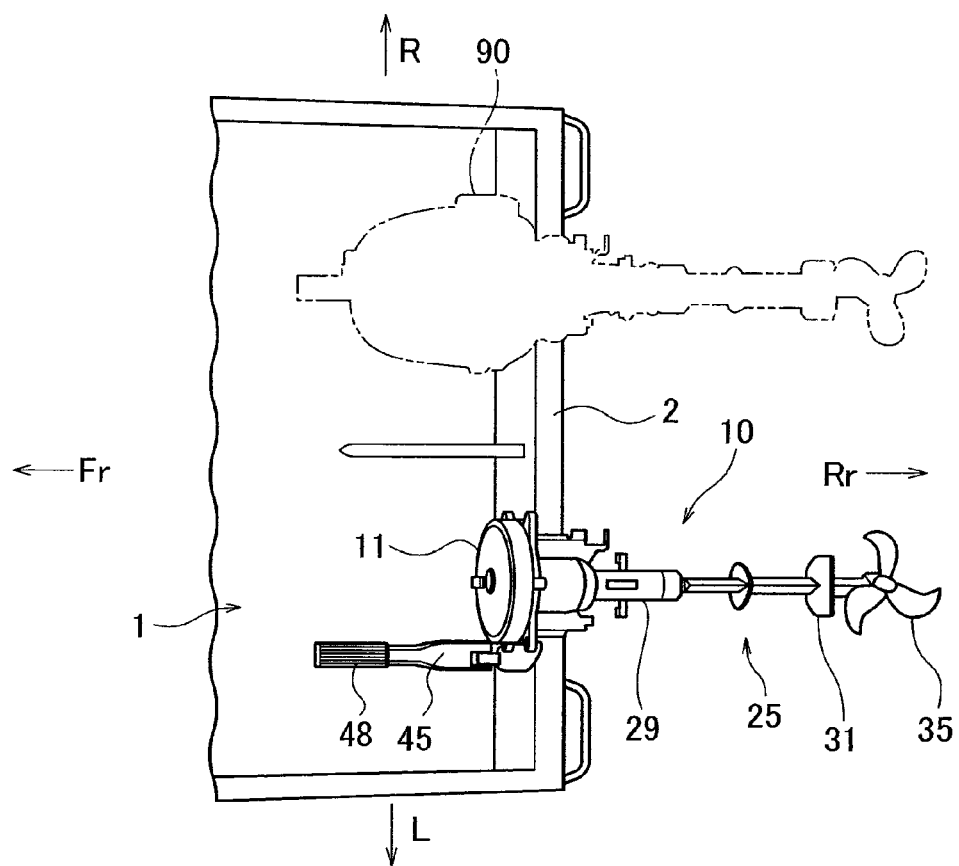
FIG. 11A is a plan view showing a state where the electric outboard motor main body is tilt-up manipulated.
Figure 11B:
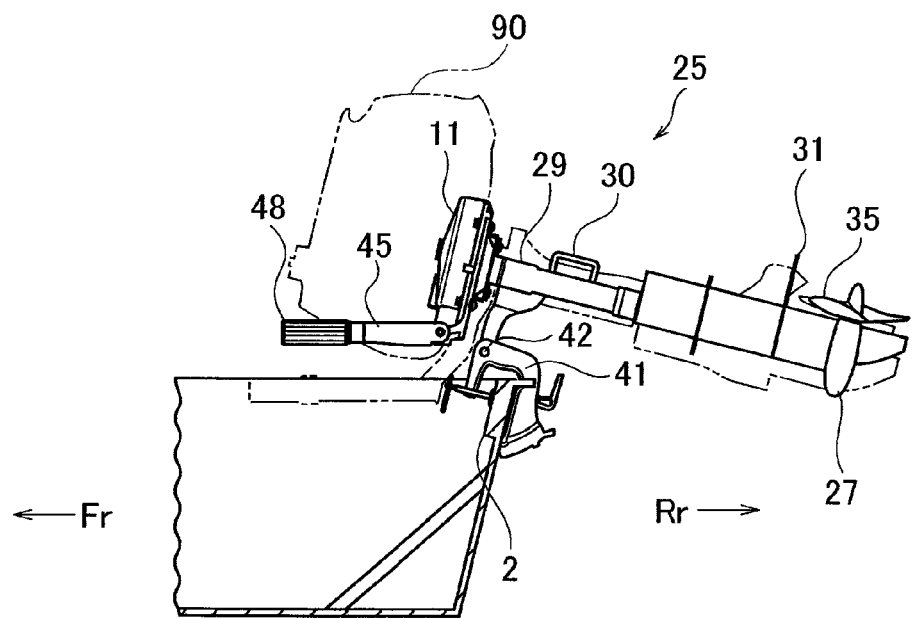
FIG. 11B is a side view showing the state where the electric outboard motor main body is tilt-up manipulated.

FIG. 11A and FIG. 11B are a plan view and a side view showing a state where the electric outboard motor main body 10 is tilt-up manipulated. As described above, since the electric motor 11 being a heavy object is positioned higher than the horizontal line passing the tilt pin 42, the boat operator can easily perform the tilt-up manipulation. Further, since the power supply/control unit 60 to which the battery pack 62 being a heavy object is attached is disposed in the hull 1, the electric outboard motor main body 10 itself is lightweight to allow the boat operator to easily perform the tilt-up manipulation as compared with the outboard motor 90. Further, the fact that the tilt-up manipulation is easy to be performed facilitates, when an underwater obstacle and the electric outboard motor main body 10 collide at the time of traveling, a tilt-up operation for reducing impact weighting to be performed and enables impact weighting against the underwater obstacle to be reduced.

Further, as shown in FIG. 11A and FIG. 11B, since the electric outboard motor main body 10 in this embodiment is small in size, when the tilt-up manipulation is performed, it is possible to reduce an overhang of the electric outboard motor main body 10 toward the hull 1 and to reduce an occupied space of the electric outboard motor main body 10 in the hull 1 as compared with the outboard motor 90. Further, as shown in the plan view of FIG. 9A, a part of the front portion of the electric motor 11 is disposed at the front of the hull 1 so as to overlap the transom board 2. That is, the position of the electric motor 11 and the position of the tilt pin 42 are close to each other, and thus it is possible to lower a maximum point to be reached of the electric outboard motor main body 10 in a height direction when the tilt-up manipulation is performed. In the above case, it is possible to easily cover an upper portion of the electric outboard motor main body 10 with a part (top plate or the like) of the hull 1. That is, it is possible to house the electric outboard motor main body 10 at a rear lower portion in the small hull 1 when the tilt-up manipulation is performed.

Figure 12:
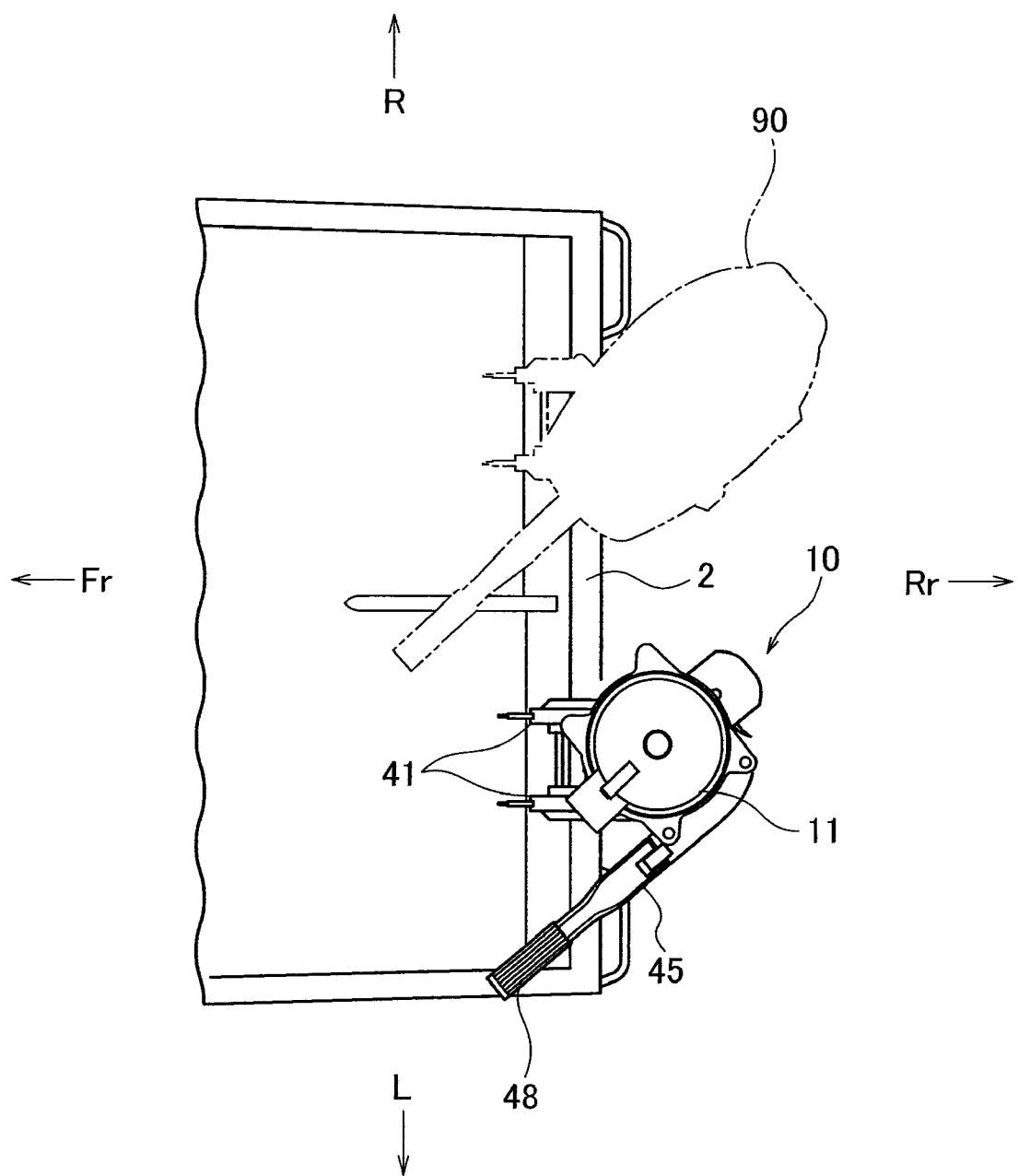
FIG. 12 is a plan view showing a state where the electric outboard motor main body is steering manipulated.

Next, the case when the steering manipulation is performed to the electric outboard motor main body 10 will be explained with reference to FIG. 12. FIG. 12 is a plan view showing a state where the steering manipulation is performed. As shown in FIG. 12, the boat operator turns the steering handle 45 in a direction in which the boat operator desires the hull 1 to travel, and thereby the electric motor 11 and the drive shaft housing 28 supported by the swivel bracket 29 pivot in the same direction. Thus, the steering manipulation makes it possible to steer the hull 1. At this time, as compared with the outboard motor 90, it is possible to improve maneuverability of the steering manipulation because the electric outboard motor main body 10 itself is lightweight. Further, since the steering handle 45 is positioned at substantially the same height as the thin electric motor 11, even in the case when the boat operator steers the steering handle 45 to a side going away from his/her body, the boat operator's arm does not interfere with the electric outboard motor main body 10 and the steering handle 45 is excellent in maneuverability.

Further, since a pivot shaft about which the steering manipulation is performed is coaxial with the output shaft 12 and the drive shaft 26 of the electric motor 11, it is possible to reduce underwater resistance when the drive shaft housing 28 pivots in the horizontal direction and to make a pivot range in the steering manipulation small. Accordingly, it is possible to further improve the maneuverability of the steering manipulation.

Figure 13:
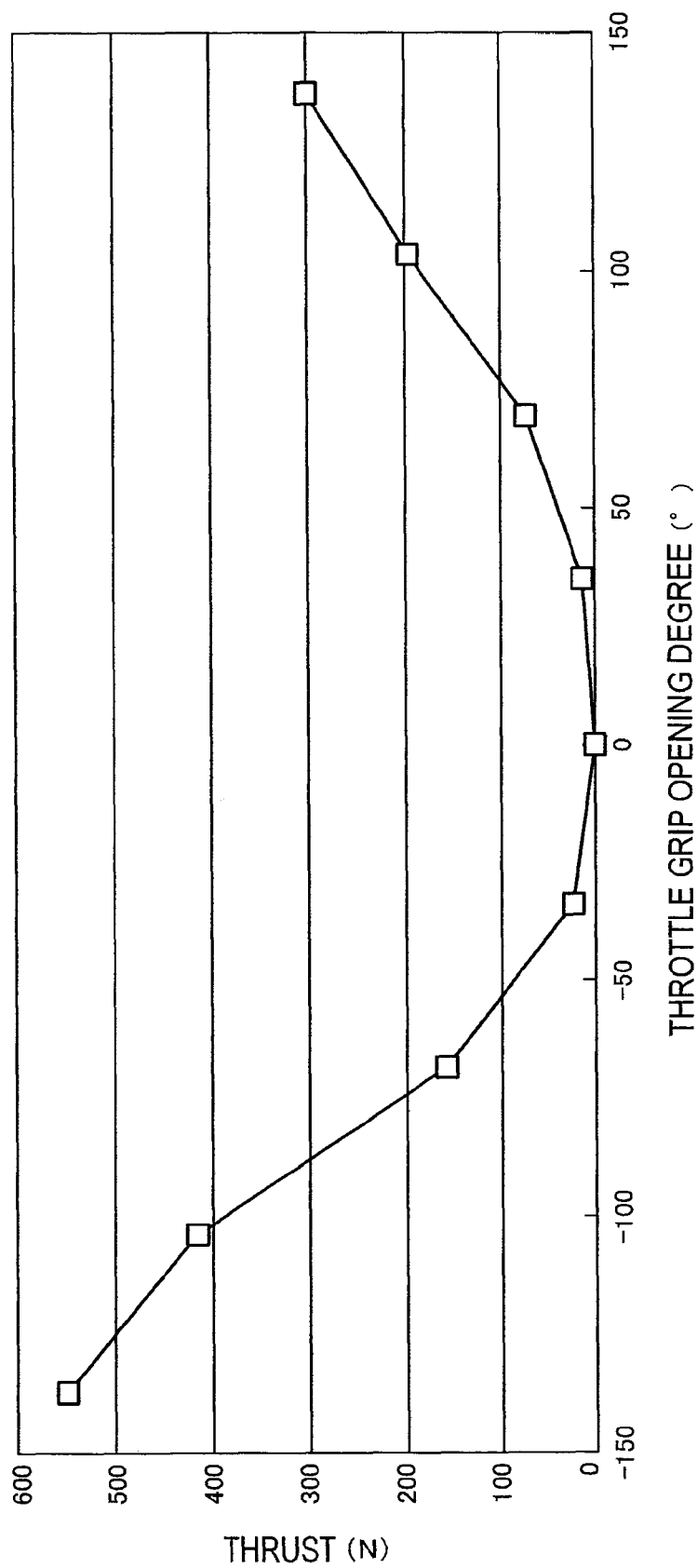
FIG. 13 is a view showing a relationship between a throttle grip and output of the electric motor.

Next, the case when output adjustment of the electric motor 11 is performed by using the throttle grip 48 of the steering handle 45 will be explained with reference to FIG. 13. FIG. 13 is a view showing a relationship between the throttle grip 48 and output of the electric motor 11. The throttle grip 48 is always biased so as to return to a neutral position, namely an opening degree of 0°, (in which the throttle amount is zero). When the boat operator twists the throttle grip 48 in one direction from the neutral position, the motor control section 67 increases the rotation speed of the electric motor 11 depending on the opening degree (throttle amount), and thereby thrust force increases.

Conversely, when the boat operator twists the throttle grip 48 in the other direction from the neutral position, the motor control section 67 makes the electric motor 11 counterrotate to increase the rotation speed of the electric motor 11 depending on the opening degree (throttle amount), resulting that the thrust force increases. The throttle grip 48 can perform not only the manipulation for adjusting the output of the electric motor 11 but also a manipulation instructing the traveling direction, so that it is possible to improve the maneuverability.

As described above, according to the present invention, since the electric outboard motor main body 10 and the power supply/control unit 60 are formed separately, it is possible to dispose the power supply/control unit 60 in the hull 1 so that the barycenter balance of the hull 1 is stabilized, and thus it is possible to improve the maneuverability of the electric outboard motor 100.

Incidentally, in the above-described embodiment, the case when the power supply/control unit is disposed at the rear of the hull is only explained, but the present invention is not limited to the above case. The power supply/control unit is only necessary to be disposed in consideration of the barycenter balance of the hull. That is, in the case when the electric outboard motor main body is extremely heavy, the power supply/control unit is disposed at the center or the front of the hull, thereby enabling the barycenter of the hull to move further forward. However, the power supply/control unit is disposed at the rear of the hull to thereby create an advantage that it is possible to shorten the cable connecting between the electric motor and the power supply/control unit.

Further, in the above-described embodiment, the case when the battery remaining amount of the battery pack 62, the rotation speed of the electric motor, and so on are displayed on the display section is only explained, but the present invention is not limited to the above case. On the display section, at least a remaining amount of power that can be supplied to the electric motor is only necessary to be displayed, and besides the above, in the case when the electric motor or the power supply/control unit is broken, an error display of the failure and a content of the failure may also be displayed.

Further, in the above-described embodiment, the case where the signal cables are wired is only explained, but the present invention is not limited to the above case, radio communication such as optical communication may also be applied, and as long as the signal cables function as the signal transmitting means, a form of the signal cables is not limited.

According to the present invention, since it is possible to dispose the power supply section in the hull so that the barycenter balance of the hull is stabilized, it is possible to improve the maneuverability of the electric outboard motor. Further, the electric outboard motor main body can be formed to be lightweight, so that it is possible to easily attach and detach the electric outboard motor main body to and from the hull.

Further, for example, the cable connecting the electric outboard motor main body and the power supply section is attachable and detachable by the couplers on a power supply section side that is not easily exposed to the water, so that a leak is prevented.

Further, for example, the battery pack and the battery pack attaching section to and from which the battery pack is attached and detached are provided, so that it is possible to detach the battery pack when not in use, and to easily perform maintenance of the battery pack and to efficiently use the battery pack.

Further, for example, the battery pack can be selectively attached to at least one of the plurality of battery pack attaching sections, so that it is possible to change the number of the battery packs to be attached depending on intended uses and to set the battery pack as a standby power supply.

Further, for example, the control section and the electric motor are communicably connected by the signal transmitting means, so that a range of types of a usable electric motor extends and control with high precision can be performed to the electric motor.

Further, for example, the control section and the display section are communicably connected by the signal transmitting means, so that the degree of freedom of which the display section is disposed expands to enable the display section to be disposed at a position easily seen by the boat operator.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An electric outboard motor being an electric outboard motor to be driven by an electric motor, the electric outboard motor comprising:
    an electric outboard motor main body including the electric motor and a propulsion section that applies the electric motor as motive power;
    a power supply section provided separately from said electric outboard motor main body in a hull, supplying power to the electric motor; and
    a control section integrated with said power supply section, controlling the electric motor,
    wherein said electric outboard motor main body and said power supply section are detachably connected by couplers, on a power supply side, via a cable,
    wherein said electric outboard motor main body and said control section are communicably connected by a signal cable of the cable,
    wherein said electric outboard motor main body includes an emergency switch, and said emergency switch and said control section are detachable connected by couplers via the signal cable on a side of said control section.

2. The electric outboard motor according to claim 1, wherein said power supply section includes a packaged battery pack and a battery pack attaching section disposed in a hull and having the battery pack attached and detached thereto and therefrom.

3. The electric outboard motor according to claim 2, further comprising:
    a display section displaying a battery remaining amount of the battery pack thereon, wherein said control section and said display section are communicably connected by the signal cable.

4. The electric outboard motor according to claim 1, wherein said electric outboard motor main body and said control section are detachably connected by couplers via the signal cable on a side of said control section.

* * * * *